(12) United States Patent
Chabaille

(10) Patent No.: US 11,098,648 B2
(45) Date of Patent: Aug. 24, 2021

(54) CHAMBER BETWEEN AN INLET NOZZLE AND AN OBTURATOR, FOR A TURBOMACHINE INJECTOR

(71) Applicant: SAFRAN AIRCRAFT ENGINES, Paris (FR)

(72) Inventor: Christophe Chabaille, Levallois Perret (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 236 days.

(21) Appl. No.: 16/304,415

(22) PCT Filed: May 29, 2017

(86) PCT No.: PCT/FR2017/051327
§ 371 (c)(1),
(2) Date: Nov. 26, 2018

(87) PCT Pub. No.: WO2017/207902
PCT Pub. Date: Dec. 7, 2017

(65) Prior Publication Data
US 2019/0292988 A1 Sep. 26, 2019

(30) Foreign Application Priority Data
May 31, 2016 (FR) ...................... 16 54941

(51) Int. Cl.
*F02C 7/232* (2006.01)
*F23K 5/14* (2006.01)
*F23R 3/28* (2006.01)

(52) U.S. Cl.
CPC ............. *F02C 7/232* (2013.01); *F23K 5/147* (2013.01); *F23R 3/283* (2013.01); *F23N 2235/24* (2020.01)

(58) Field of Classification Search
CPC ............. F23R 3/28; F23R 3/283; F02C 7/232
See application file for complete search history.

(56) References Cited

U.S. PATENT DOCUMENTS 4,041,695 A * 8/1977 Harper .................. F02C 7/232
60/779
4,561,468 A * 12/1985 Kreitchman ............ F02C 7/232
137/508

(Continued)

FOREIGN PATENT DOCUMENTS

EP 1 507 108 A1 2/2005

OTHER PUBLICATIONS

International Search Report dated Sep. 19, 2017 in PCT/FR2017/051327 filed May 29, 2017.

(Continued)

*Primary Examiner* — Craig Kim
(74) *Attorney, Agent, or Firm* — Oblon, McClelland, Maier & Neustadt, L.L.P.

(57) ABSTRACT

An inlet body for a fluid injector for a turbomachine. The inlet body includes a casing defined by an internal surface and a seal valve housed inside the casing. The valve includes a sealing member including an intake duct, and internal duct into which the intake duct opens, and a seat for the sealing member. The seat defines an opening over a fluid path towards the internal duct. The internal surface includes a recess which defines at least partially a chamber communicating with the opening and with the intake duct.

11 Claims, 2 Drawing Sheets

(56) References Cited

U.S. PATENT DOCUMENTS

| | | | | |
|---|---|---|---|---|
| 4,570,668 A | * | 2/1986 | Burke | F02C 7/232 |
| | | | | 137/512.2 |
| 4,938,418 A | * | 7/1990 | Halvorsen | F02C 9/263 |
| | | | | 239/390 |
| 5,918,628 A | * | 7/1999 | Harding | F02C 7/232 |
| | | | | 137/497 |
| 8,636,263 B2 | * | 1/2014 | Deaton | F02C 7/232 |
| | | | | 251/337 |
| 2005/0034766 A1 | | 2/2005 | Rado | |
| 2005/0262824 A1 | * | 12/2005 | Yates | F02C 9/32 |
| | | | | 60/39.281 |
| 2010/0037615 A1 | * | 2/2010 | Williams | F02C 7/232 |
| | | | | 60/741 |
| 2010/0162708 A1 | * | 7/2010 | Erickson | F02C 7/232 |
| | | | | 60/734 |
| 2012/0159953 A1 | * | 6/2012 | Griffiths | F02C 7/228 |
| | | | | 60/734 |

OTHER PUBLICATIONS

French Preliminary Search Report dated Feb. 15, 2017 in Patent Application No. 1654941 filed May 31, 2016.
U.S. Appl. No. 15/504,387, filed Feb. 16, 2017, US 2017/0234539 A1, Chabaille, et al.
U.S. Appl. No. 15/544,175, filed Jul. 17, 2017, US 2018/0003385 A1, Rodrigues, et al.

* cited by examiner

CHAMBER BETWEEN AN INLET NOZZLE AND AN OBTURATOR, FOR A TURBOMACHINE INJECTOR

TECHNICAL FIELD

The invention relates to fluid injectors for an aircraft turbomachine, such as turbojet engines and turboprop engines. It is concerned in particular with aeromechanics type injectors.

State of Prior Art

Inlet bodies for fuel injector of a turbomachine of a known structure comprise a shell delimited by an inner surface, a sealing valve configured to open when the fuel pressure exceeds a first threshold, the valve being housed in a cylindrical bore inside the shell.

The valve comprises an obturator in which a fuel circulation inner duct is made. The inlet body comprises an intermediate volume delimited by the bore, on the fuel path which flows from an aperture through the obturator seat to the inner duct.

Contaminants present in fuel and/or ice are likely to obstruct the inlet body, by blocking the obturator movement. A significant obstruction of the inlet body can cause untimely shutdown of the fuel supply to the combustion chamber by the injector.

DISCLOSURE OF THE INVENTION

The invention aims at least partially at solving the problems of obstruction of the injector inlet body met in the solutions of prior art.

In this regard, the object of the invention is an inlet body for a fluid injector of a turbomachine.

The inlet body comprises a shell comprising an inner surface, and a sealing valve configured to open when the fuel pressure exceeds a first threshold, the valve being housed inside the shell.

The valve comprises an obturator movable with respect to the shell between an open position and a closed position, and a seat for the obturator which is fixed with respect to the shell.

The obturator comprises an inner duct and at least one intake duct opening into the inner duct.

The seat defines a fluid passage aperture to the inner duct, the intake duct being configured to fluidly connect the inner duct to the aperture when the obturator is in an open position. The obturator is configured to cooperate with the seat so as to block fluid passage between the aperture and the inner duct in the closed position.

According to the invention, the inner surface comprises a recess which at least partially delimits a chamber communicating with the aperture and with the at least one intake duct in the open position of the obturator.

By virtue of the invention, contaminants and/or ice present in fuel are retained in the chamber, instead of blocking the obturator.

The chamber is on the fluid path which flows from the aperture to the inner duct. By being delimited by a recess of the inner surface, it has a higher volume than the intermediate volume of known solutions, and it limits obstruction of the inlet body.

The chamber according to the invention enables the injector replacement frequency to be limited, by limiting risks of injector obstruction.

The external shell delimits the inlet body outwardly and it delimits the injector outwardly at the inlet body.

The invention can optionally include one or more of the following characteristics combined together or not.

Advantageously, the recess comprises a substantially annular groove about a longitudinal axis of the inlet body.

According to one feature, the inner surface delimits downstream of the chamber a circular cross-section substantially cylindrical space, a ratio of the diameter of the chamber to a diameter of the space being between 1.15 and 1.25.

According to an advantageous embodiment, the chamber is partially delimited by the obturator, it surrounds at least partially the obturator, at least in the closed position of the obturator.

According to another advantageous embodiment, the at least one intake duct is tilted with respect to the longitudinal axis of the inlet body.

The invention is also concerned with a fluid injector, comprising an inlet body as defined above.

The invention also relates to a combustion chamber for a turbomachine comprising an injector as defined above, the injector being configured to inject fuel inside the combustion chamber.

Further, the invention relates to a turbomachine comprising a combustion chamber as defined above and/or an injector as defined above.

BRIEF DESCRIPTION OF THE DRAWINGS

The present invention will be better understood upon reading the description of exemplary embodiments, given by way of purely indicating and in no way limiting purposes, making reference to the appended drawings in which.

DETAILED DISCLOSURE OF PARTICULAR EMBODIMENTS

Figure 1:
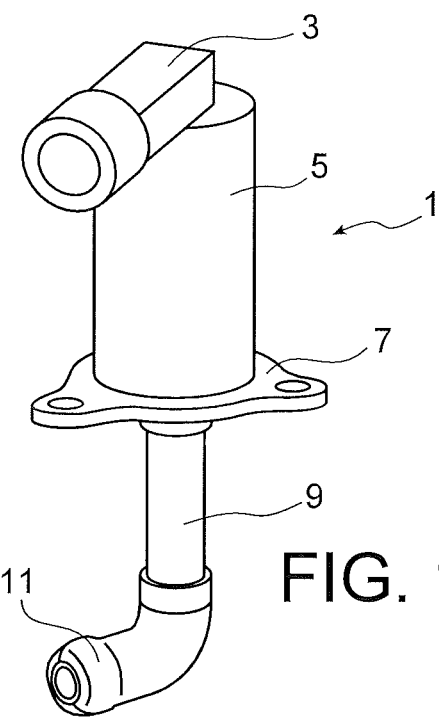
FIG. 1 is a partial schematic representation of a turbomachine fuel injector, according to a first embodiment of the invention.
Figure 2:
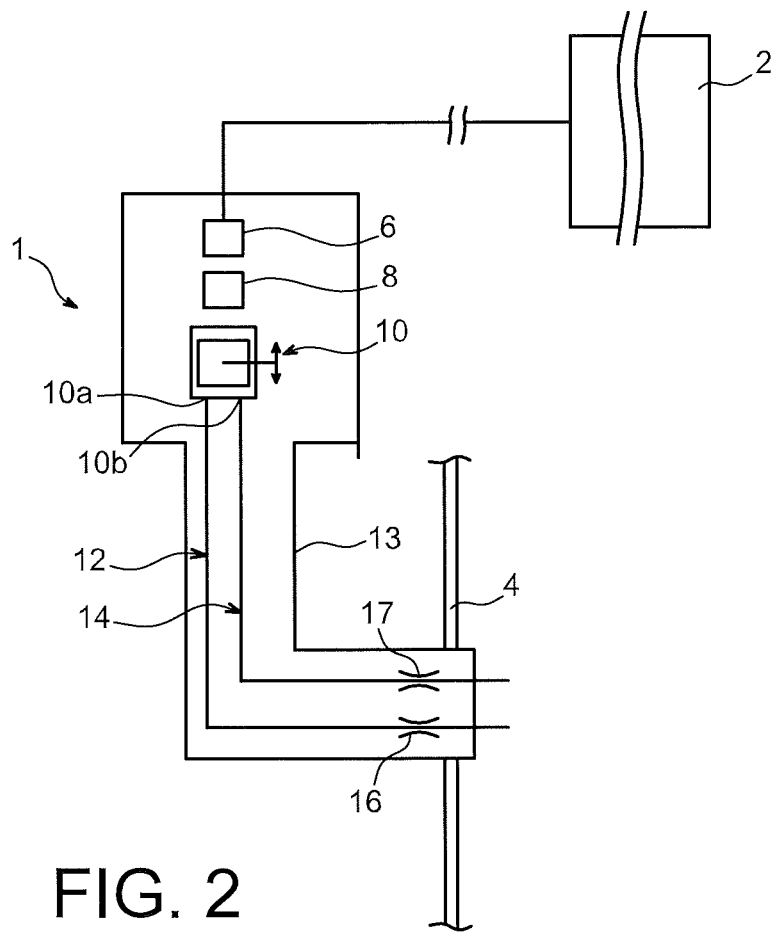
FIG. 2 is a functional schematic representation of the injector according to the first embodiment, in a turbomachine.

Identical, similar or equivalent parts of the different figures bear the same reference numerals so as to facilitate switching from one FIG. to the other.

FIG. 1 represents a fuel injector 1 for an aircraft turbomachine, according to a preferred embodiment of the invention.

The injector 1 is supplied with fuel from a turbomachine tank 2. At its downstream end, the injector 1 passes through a combustion chamber bottom 4, in a known manner to those skilled in the art.

In the present document, the terms "upstream" and "downstream" are used in reference to the fuel flow direction in the injector 1 towards the combustion chamber.

The injector 1 comprises an inlet body 3, a central body 5 into which the inlet body 3 opens, a securing bracket 7 for securing the injector 1 to a wall of the combustion chamber, an injection rod 9, and an injector nozzle 11 located in proximity of the distal end of the injection rod 9.

The injector 1 comprises, from upstream to downstream, a sealing valve 6, a diaphragm 8, a metering device 10. The device 10 comprises a first fuel outlet 10a and a second fuel outlet 10b distinct from the first outlet 10a. The first outlet 10a supplies a primary fuel circuit 12, whereas the second outlet 10b supplies a secondary fuel circuit 14, for circulating higher flow rates towards the combustion chamber.

The primary circuit 12 includes a primary swirler 16, for rotating the fuel for spraying it. The secondary circuit 14 includes a secondary swirler 17.

The sealing valve 6, the diaphragm 8, the metering device 10, the primary circuit 12 and the secondary circuit 14 are arranged inside a shell 13 delimiting the injector 1.

Figure 3:
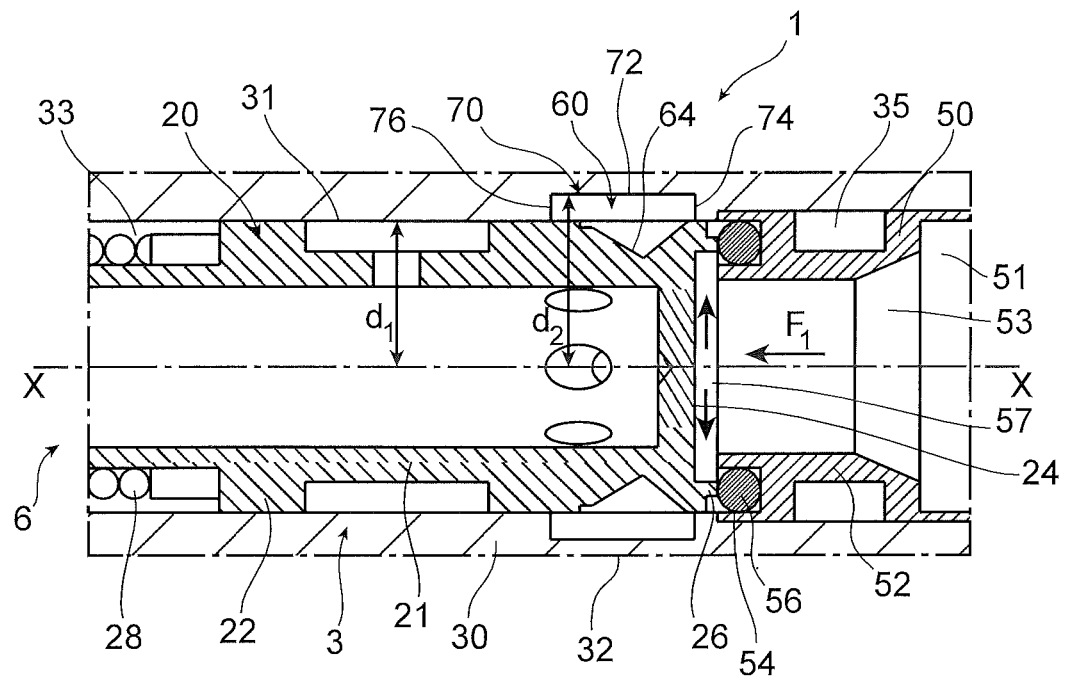
FIG. 3 is a longitudinal cross-section partial schematic representation of an inlet body of the injector according to the first embodiment, when an obturator of the injector is in the closed position.
Figure 4:
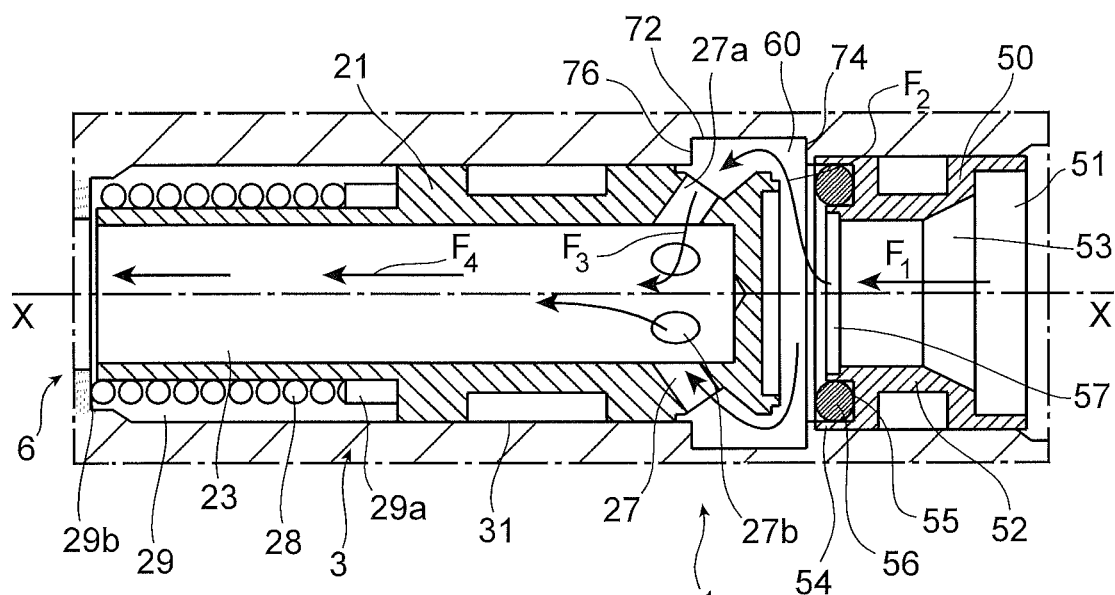
FIG. 4 is a longitudinal cross-section partial schematic representation of an inlet body of the injector according to the first embodiment, when the obturator is in the open position.

In reference to FIGS. 3 and 4 together, the inlet body 3 is substantially annular about a longitudinal axis X-X.

In the following of the disclosure, a direction parallel to the direction of the longitudinal axis X-X is called an axial direction, a direction orthogonal to the axial direction is called a radial direction.

The inlet body 3 is delimited by a shell 30 which is part of the external shell 13 of the injector 1. The shell 30 comprises an inner surface 31 and an outer surface 32 opposite to the inner surface 31. The outer surface 32 is a circular cross-section substantially cylindrical surface.

The inlet body 3 houses the sealing valve 6 inside the shell 30. The valve 6 includes an obturator 20, a spring 28 and an inlet tip 50.

The obturator 20 comprises a body 21 and an inner duct 23 inside the body 21, and intake ducts 27 which open into the inner duct 23.

The obturator 20 is movable inside the shell 30. It is configured to be open when the fuel pressure is higher than a first threshold. It is configured to be closed if the fuel pressure is lower than this first threshold.

The obturator 20 forms a valve for fuel intake into the central body 5 of the injector 1. It is also known as an "inlet valve". In particular, the obturator 20 is of "the on-off" type: it only includes a single stable position in the open position and a single stable position in the closed position.

The body 21 of the obturator 20 comprises an annular wall 22, a bottom wall 24, and a contact rim 26.

The bottom wall 24 closes the obturator 20 to upstream. This bottom wall 24 is surrounded by the annular contact rim 26.

The contact rim 26 is for contacting a gasket 56 of the inlet tip 50, in the closed position of the obturator 20.

The annular wall 22 is a circular cross-section substantially cylindrical wall. It delimits with the inner surface 31 a housing annular cavity 29 of the spring 28. This cavity 29 is delimited along the axial direction by a first stop 29a formed by the annular wall 22 and a second stop 29b formed by the shell 30.

The spring 28 is a compression spring which is configured to bias the obturator 20 towards its closed position. The spring 28 is for example a helical spring.

The inner duct 23 is made inside the body 21. It is located in the central part of the body 21. It is used to let fuel pass through the obturator 20, towards the injector nozzle 11.

The intake ducts 27 are angularly distributed through the body 21 of the obturator 20. The intake ducts 27 are each tilted to downstream with respect to the longitudinal direction to facilitate fuel flow towards the combustion chamber.

Each intake duct 27 takes the form of a channel which extends between a first port 27a which opens onto an external side surface 64 of the obturator 20 in a chamber 60 and a second port 27b which opens into the inner duct 23.

The chamber 60 is used to fluidly connect the inlet tip 50 to the obturator 20, in the open position of the obturator 20. It will be described hereinafter.

The inlet tip 50 comprises an annular body 52 through which an inlet 51 and an outlet 57 pass at its two opposite ends along the axial direction. The inlet 51 of the inlet tip 50 opens into outside of the injector 1. The outlet 57 of the inlet tip 50 opens into the chamber 60.

The inlet tip 50 includes a central duct 53 which extends from its inlet 51 to its outlet 57, along the longitudinal direction.

The body 52 comprises an annular rim 54 in proximity of the outlet 57. This rim 54 comprises a throat 55 to house a gasket 56. This gasket 56 is for example an O-ring.

The gasket 56 is for contacting the contact rim 26 of the obturator 20 in the closed position of the obturator 20, to prevent fuel from flowing between the outlet 57 and the inner duct 23.

The inlet tip 50 thereby plays the role of a seat for the obturator 20, in the closed position of the obturator 20.

In reference to FIG. 3, the obturator 20 is housed in a housing space 33 delimited by the inner surface 31 of the shell 30, and the inlet tip 50 is located in a housing space 35 delimited by the inner surface 31.

The housing space 33 of the obturator takes the form of a circular cross-section cylindrical bore with a radius $d_1$. The radius $d_1$ corresponds to the distance between the longitudinal axis X-X of the inlet body 3 and the inner surface 31.

The housing space 35 of the inlet tip 50 takes the form of a circular cross-section cylindrical bore, with a radius substantially identical to that of the housing space 33 of the obturator.

The chamber 60 is located between the housing space 35 of the inlet tip and the housing space of the obturator 33, along the longitudinal direction. In particular, the chamber 60 is mostly, otherwise fully located between the outlet 57 of the inlet tip 50 and the intake ducts 27, in the open position of the obturator 20.

The inner surface 31 delimits the chamber 60 radially outwardly. The inner surface 31 comprises an annular groove 70 at the chamber 60. The recess left by the groove 70 is used to increase the volume of the chamber 60.

The groove 70 comprises a first sidewall 74 and a second sidewall 76 opposite to the first sidewall 74 and substantially parallel to the first sidewall 74. The first sidewall 74 substantially delimits the upstream of the chamber 60, whereas the second sidewall 76 substantially delimits the downstream of the chamber 60. The first sidewall 74 extends substantially radially.

The groove 70 is delimited radially outwardly by a longitudinal wall 72 which connects both sidewalls 74, 76 along the longitudinal direction. The longitudinal wall 72 substantially extends along the longitudinal direction.

The groove 70 takes the form of a circular cross-section substantially cylindrical bore centred on the longitudinal axis X-X, and with a radius $d_2$. The radius $d_2$ corresponds to the distance between the longitudinal axis X-X of the inlet body 50 and the inner surface 31.

The groove 70 is for example made by machining the inner surface 31 of the shell 30.

The ratio of the radius $d_2$ of the chamber to the radius $d_1$ of the housing space 33 of the obturator is between 1.15 and 1.25.

The chamber 60 is delimited radially inwardly by the external side surface 64 of the obturator 20, in the closed position of the obturator. It is delimited only partially radially inwardly by the obturator 20 in the open position of the obturator 20.

The movement of the obturator 20 will now be explained below in reference to FIGS. 3 and 4.

In FIG. 3, the obturator 20 is in the closed position. The fuel pressure onto the bottom wall 24 of the obturator is lower than the opening threshold of the obturator 20, called a first threshold.

The contact rim 26 of the obturator 20 is in mechanical contact with the gasket 56. The chamber 60 is integrally radially inwardly closed by the annular wall 22 of the obturator 20. The obturator 20 prevents fuel emerging with the flux $F_1$ into the injector 1 from flowing up to the chamber 60.

In FIG. 4, the obturator 20 is in the open position. The fuel pressure on the bottom wall 24 of the obturator is higher than the first threshold.

The contact rim 26 is remote from the inlet tip 50, by being devoid of direct mechanical contact with the gasket 56. The chamber 60 is only partially radially inwardly sealed by the annular wall 22.

The fuel which emerges with the flux $F_1$ into the injector 1 passes through the central duct 53, it flows through the outlet 57 of the inlet tip 50 into the chamber 60 with the flux $F_2$.

The fuel in the chamber 60 continues flowing downstream through the intake ducts 27 up to the inner duct 23 with the flux $F_3$. The fuel in the inner duct 23 finally flows downstream with the flux $F_4$ towards the metering device 10 of the injector 1.

The chamber 60 has a significant volume because of the groove-shaped recess 70 made in the inner surface 31. Contaminants present in the fuel, such as metal residues or ice present in the fuel are retained in the chamber 60, which limits obstruction risks for the intake ducts 27.

In particular, ice which would be present in the fuel further tends to melt in the chamber 60 under the effect of the fuel flow pressure through the chamber 60.

The chamber 60 thus enables the replacement frequency of the injector 1 to be limited within the turbomachine, while being simple to be made, for example by machining the inner surface 31 of the shell 30.

Of course, various modifications could be provided by those skilled in the art to the invention just described without departing from the scope of disclosure of the invention.

The invention claimed is:

1. An inlet body for a fluid injector for a turbomachine, comprising:
    an external shell comprising an inner surface, wherein the external shell partially delimits the fluid injector outwardly; and
    a sealing valve configured to open when a fuel pressure exceeds a first threshold, wherein the sealing valve is housed inside the external shell and wherein the sealing valve comprises:
        an obturator movable with respect to the external shell between an open position and a closed position, wherein the obturator comprises an inner duct and an intake duct opening which opens into the inner duct, and
        a seat for the obturator, wherein the seat is fixed with respect to the external shell, wherein the seat defines a fluid passage aperture to the inner duct, wherein the intake duct is configured to fluidly connect the inner duct to the fluid passage aperture when the obturator is in the open position,
    wherein the obturator is configured to cooperate with the seat so as to block fluid passage between the fluid passage aperture and the inner duct when the obturator is in the closed position, and
    wherein the inner surface includes a recess which at least partially delimits a chamber, wherein the chamber communicates with the fluid passage aperture and with the intake duct opening in the open position of the obturator.

2. The inlet body according to claim 1, wherein the recess comprises a substantially annular groove about a longitudinal axis of the inlet body.

3. The inlet body according to claim 1, wherein the inner surface delimits downstream of the chamber a substantially cylindrical space having a circular cross-section, wherein a ratio of a diameter of the chamber to a diameter of the space is between 1.15 and 1.25.

4. The inlet body according to claim 1, wherein the chamber is partially delimited by the obturator, wherein the chamber at least partially surrounds the obturator at least in the closed position of the obturator.

5. The inlet body according to claim 1, wherein the at least one intake duct is tilted with respect to a longitudinal axis of the inlet body.

6. The inlet body according to claim 1, wherein the seat includes an inlet tip including an inlet opening into an outside of the fluid injector, and a central duct extending from the inlet to the fluid passage aperture along a longitudinal direction,
    wherein the inlet tip is located in a first housing space delimited by the inner surface, and the obturator is housed in a second housing space delimited by the inner surface, a radius of the first housing space being identical to a radius of the second housing space, and
    wherein the chamber is located between the first housing space and the second housing space in the longitudinal direction.

7. The inlet body according to claim 6, wherein a body of the obturator includes an annular wall, a bottom wall which closes the obturator to upstream, and a contact rim which surround the bottom wall, the contact rim contacting a gasket of the inlet tip in the closed position of the obturator.

8. The inlet body according to claim 2, wherein the groove includes a first sidewall, a second sidewall opposite to the first sidewall and parallel to the first sidewall, and a longitudinal wall connecting the first sidewall and the second sidewall, the longitudinal wall delimiting the groove radially outward.

9. A fluid injector comprising:
    an inlet body comprising:
        an external shell comprising an inner surface, wherein the external shell partially delimits the fluid injector outwardly, and
        a sealing valve configured to open when a fuel pressure exceeds a first threshold, wherein the sealing valve is housed inside the external shell and wherein the sealing valve comprises:
            an obturator movable with respect to the external shell between an open position and a closed position, wherein the obturator comprises an inner duct and an intake duct opening which opens into the inner duct, and
            a seat for the obturator, wherein the obturator is fixed with respect to the external shell, wherein the seat defines a fluid passage aperture to the inner duct, wherein the intake duct is configured to fluidly connect the inner duct to the fluid passage aperture when the obturator is in the open position, wherein the obturator is configured to cooperate with the seat so as to block fluid passage between the fluid passage aperture and the inner duct when the obturator is in the closed position, and wherein the inner surface includes a recess which at least partially delimits a chamber, wherein the chamber communicates with the fluid passage aperture and with the intake duct opening in the open position of the obturator.

10. A combustion chamber for a turbomachine comprising a fluid injector according to claim 9, wherein the fluid injector is configured to inject fuel inside the combustion chamber.

11. A turbomachine comprising a combustion chamber according to claim 10.

\* \* \* \* \*